United States Patent
Dixit et al.

(10) Patent No.: US 10,412,079 B2
(45) Date of Patent: Sep. 10, 2019

(54) NFC DEVICE, SOFTWARE INSTALLATION METHOD, SOFTWARE UNINSTALLATION METHOD, COMPUTER PROGRAM AND ARTICLE OF MANUFACTURE

(71) Applicant: NXP B.V., Eindhoven (NL)

(72) Inventors: Harish Dixit, Bangalore (IN); Rahul Ravindra Pathak, Bangalore (IN)

(73) Assignee: NXP B.V., Eindhoven (NL)

( * ) Notice: Subject to any disclaimer, the term of this patent is extended or adjusted under 35 U.S.C. 154(b) by 120 days.

(21) Appl. No.: 14/866,638

(22) Filed: Sep. 25, 2015

(65) Prior Publication Data

US 2016/0094545 A1    Mar. 31, 2016

(30) Foreign Application Priority Data

Sep. 26, 2014  (EP) ..................................... 14186694

(51) Int. Cl.
*G06F 17/30*  (2006.01)
*H04L 29/06*  (2006.01)
(Continued)

(52) U.S. Cl.
CPC ............ *H04L 63/0853* (2013.01); *G06F 8/61* (2013.01); *G06F 8/62* (2013.01); *G06F 21/123* (2013.01); *H04B 5/0056* (2013.01); *H04L 63/0492* (2013.01); *H04L 63/18* (2013.01); *H04W 76/10* (2018.02); *G06F 2221/0704* (2013.01)

(58) Field of Classification Search
CPC . H04L 63/08; H04L 63/0823; H04L 67/1097; H04L 63/10; H04L 67/20; H04L 63/0492; G06F 17/30595; G06F 21/33; G06F 21/35; G06F 3/062; G06F 12/1441;
(Continued)

(56) References Cited

U.S. PATENT DOCUMENTS

| 7,948,925 B2 * | 5/2011 | Miyabayashi ...... H04L 63/0492 370/302 |
| 8,014,720 B2 | 9/2011 | Lortz |

(Continued)

FOREIGN PATENT DOCUMENTS

| CN | 1561026 A | 1/2005 |
| CN | 101136079 A | 3/2008 |

(Continued)

OTHER PUBLICATIONS

"Steam12forum", 6 pgs., retreived from the internet at: http://forums.steampowered.com/forums/archive/index.php/t-2504984.html (Jul. 30, 2014).

*Primary Examiner* — Farid Homayounmehr
*Assistant Examiner* — Lizbeth Torres-Diaz (57) ABSTRACT

There is disclosed an NFC device comprising an NFC communication unit and a memory unit; the NFC device being arranged to receive, through the NFC communication unit, a device identifier of a computing device and to store said device identifier in the memory unit; the NFC device further being arranged to send, upon or after storing said device identifier, at least one software installation key through the NFC communication unit to the computing device. Furthermore, a corresponding software installation method, software uninstallation method, computer program and article of manufacture are disclosed.

12 Claims, 5 Drawing Sheets

(51) Int. Cl.
*H04W 76/10* (2018.01)
*G06F 21/12* (2013.01)
*G06F 8/61* (2018.01)
*H04B 5/00* (2006.01)

(58) Field of Classification Search
CPC .... G06F 21/31; G06Q 20/3563; G06Q 20/32; G06Q 20/3278
See application file for complete search history.

(56) References Cited

U.S. PATENT DOCUMENTS

| | | | |
|---|---|---|---|
| 8,219,828 B2 | 7/2012 | Maetz et al. | |
| 9,396,350 B1* | 7/2016 | Feldman | G06F 9/465 |
| 9,706,497 B2* | 7/2017 | Tian | H04B 5/00 |
| 2003/0028787 A1* | 2/2003 | Fayed | G06F 21/10 |
| | | | 713/189 |
| 2008/0303631 A1* | 12/2008 | Beekley | G06F 21/79 |
| | | | 340/5.74 |
| 2009/0098936 A1 | 4/2009 | Lawrence et al. | |
| 2009/0227282 A1* | 9/2009 | Miyabayashi | H04L 63/0492 |
| | | | 455/552.1 |
| 2010/0167643 A1* | 7/2010 | Hirsch | H04L 63/18 |
| | | | 455/41.1 |
| 2011/0185183 A1* | 7/2011 | Yamamoto | G06F 21/33 |
| | | | 713/182 |
| 2011/0313922 A1* | 12/2011 | Ben Ayed | G06Q 20/108 |
| | | | 705/42 |
| 2012/0252405 A1* | 10/2012 | Lortz | G06F 8/60 |
| | | | 455/410 |
| 2013/0095753 A1* | 4/2013 | Chen | H04W 76/10 |
| | | | 455/41.1 |
| 2013/0125111 A1 | 5/2013 | Michielsens et al. | |
| 2013/0167136 A1* | 6/2013 | Goldman | G06F 8/61 |
| | | | 717/175 |
| 2013/0312072 A1* | 11/2013 | van Roermund | H04L 63/0492 |
| | | | 726/6 |
| 2014/0028438 A1* | 1/2014 | Kuenzi | G07C 9/00817 |
| | | | 340/5.24 |
| 2014/0194105 A1 | 7/2014 | Lee et al. | |
| 2014/0227972 A1* | 8/2014 | Swaminathan | H04B 5/0031 |
| | | | 455/41.1 |
| 2014/0279479 A1* | 9/2014 | Maniar | G06Q 20/36 |
| | | | 705/41 |
| 2017/0055101 A1* | 2/2017 | Studerus | H04W 4/50 |

FOREIGN PATENT DOCUMENTS

| | | | | |
|---|---|---|---|---|
| DE | 102009008991 A1 | 8/2010 | | |
| EP | 1936531 A1 * | 6/2008 | .......... | G06F 21/123 |
| EP | 2 453 398 A1 | 5/2012 | | |

\* cited by examiner

| |
|---|
| [UID 1] |
| [Device ID 1]:[Installation Byte 1]<br>[Device ID 1]:[Installation Byte 2]<br>[Device ID 2]:[Installation Byte 1]<br>[Device ID 3]:[Installation Byte 1] |
| [Installation Byte 1]:[Installation Key 1]<br>[Installation Byte 2]:[Installation Key 2]<br>[Installation Byte 1]:[Uninstallation Key 1]<br>[Installation Byte 2]:[Uninstallation Key 2] |

FIG. 4

| |
|---|
| [UID 1]:[Device ID 1]:[Installation Byte 1]<br>[UID 1]:[Device ID 1]:[Installation Byte 2]<br>[UID 1]:[Device ID 3]:[Installation Byte 1]<br>[UID 1]:[Device ID 4]:[Installation Byte 1] |
| [UID 2]:[Device ID 1]:[Installation Byte 1]<br>[UID 2]:[Device ID 4]:[Installation Byte 1]<br>[UID 2]:[Device ID 4]:[Installation Byte 2]<br>[UID 2]:[Device ID 4]:[Installation Byte 3] |
| [UID 3]:[Device ID 5]:[Installation Byte 1]<br>[UID 3]:[Device ID 5]:[Installation Byte 2] |
| [UID 4]:[Device ID 6]:[Installation Byte 1] |

FIG. 5

NFC DEVICE, SOFTWARE INSTALLATION METHOD, SOFTWARE UNINSTALLATION METHOD, COMPUTER PROGRAM AND ARTICLE OF MANUFACTURE

CROSS-REFERENCE TO RELATED APPLICATIONS

This application claims the priority under 35 U.S.C. § 119 of European patent application no. 14186694.7, filed on Sep. 26, 2014, the contents of which are incorporated by reference herein.

FIELD

The present disclosure relates to a Near Field Communication (NFC) device. Furthermore, the present disclosure relates to a corresponding software installation method, a corresponding software uninstallation method, a corresponding computer program and a corresponding article of manufacture.

BACKGROUND

The installation of software on a computing device, such as a personal computer or a laptop, may require the use of an installation key. For example, if the software is delivered on a Compact Disc (CD) or a Digital Versatile Disc (DVD), an installation key may be written on a box containing the disc, or it may be provided in a text file on said disc. The user should then copy the installation key to a computer program which manages the installation of the software, for example an installation wizard installed on the computing device. This process may be inconvenient and prone to errors. Furthermore, it may be susceptible to security risks. In particular, the installation key may be cracked very easily by means of key generators or brute force mechanisms. Therefore, this process does not offer sufficient protection against the misuse of software.

SUMMARY

There is disclosed an NFC device comprising an NFC communication unit and a memory unit; the NFC device being arranged to receive, through the NFC communication unit, a device identifier of a computing device and to store said device identifier in the memory unit; the NFC device further being arranged to send, upon or after storing said device identifier, at least one software installation key through the NFC communication unit to the computing device.

In illustrative embodiments, the NFC device is further arranged to send, to the computing device, at least one software installation byte which is indicative of a specific computer program or program element to be installed.

In illustrative embodiments, the NFC device is further arranged to send, to the computing device, at least one software uninstallation key.

In illustrative embodiments, the NFC device is further arranged to prohibit overwriting and deleting the device identifier from the memory unit until the NFC device receives, through the NFC communication unit, a delete command from the computing device.

In illustrative embodiments, the NFC device is further arranged to accommodate, in the memory unit, at least one authentication key for authenticating the NFC device to the computing device.

In illustrative embodiments, the NFC device is an NFC-enabled smart card.

In illustrative embodiments, the NFC device is an emulated NFC card.

In illustrative embodiments, an NFC-enabled mobile device comprises an NFC device of the kind set forth.

In illustrative embodiments, a system comprises an NFC device of the kind set forth, as well as a computing device, wherein said computing device comprises a further NFC communication unit for establishing communication with the NFC device.

In illustrative embodiments, the system further comprises a cloud database connectable to the computing device, said cloud database comprising a record of a pairing relationship between the NFC device and the computing device.

In illustrative embodiments, the computing device comprises a secure element for generating the device identifier.

Furthermore, there is disclosed a software installation method comprising: receiving, by an NFC device, through an NFC communication unit comprised in the NFC device, a device identifier of a computing device and storing, by the NFC device, said device identifier in a memory unit comprised in the NFC device; sending, by the NFC device, upon or after storing said device identifier, at least one software installation key through the NFC communication unit to the computing device.

Furthermore, there is disclosed a software uninstallation method comprising sending, by an NFC device that has received and stored a device identifier of a computing device in a memory unit of said NFC device, at least one software uninstallation key to said computing device.

Furthermore, there is disclosed a computer program comprising executable instructions which, when being executed by a processing unit, cause said processing unit to perform a method of the kind set forth.

Furthermore, there is disclosed an article of manufacture including a non-transitory computer-readable storage medium having a computer program stored thereon that comprises executable instructions which, when being executed by a processing unit, cause said processing unit to perform a method of the kind set forth.

DESCRIPTION OF DRAWINGS

Embodiments will be described in more detail with reference to the appended drawings, in which.

DESCRIPTION OF EMBODIMENTS

Figure 1A:
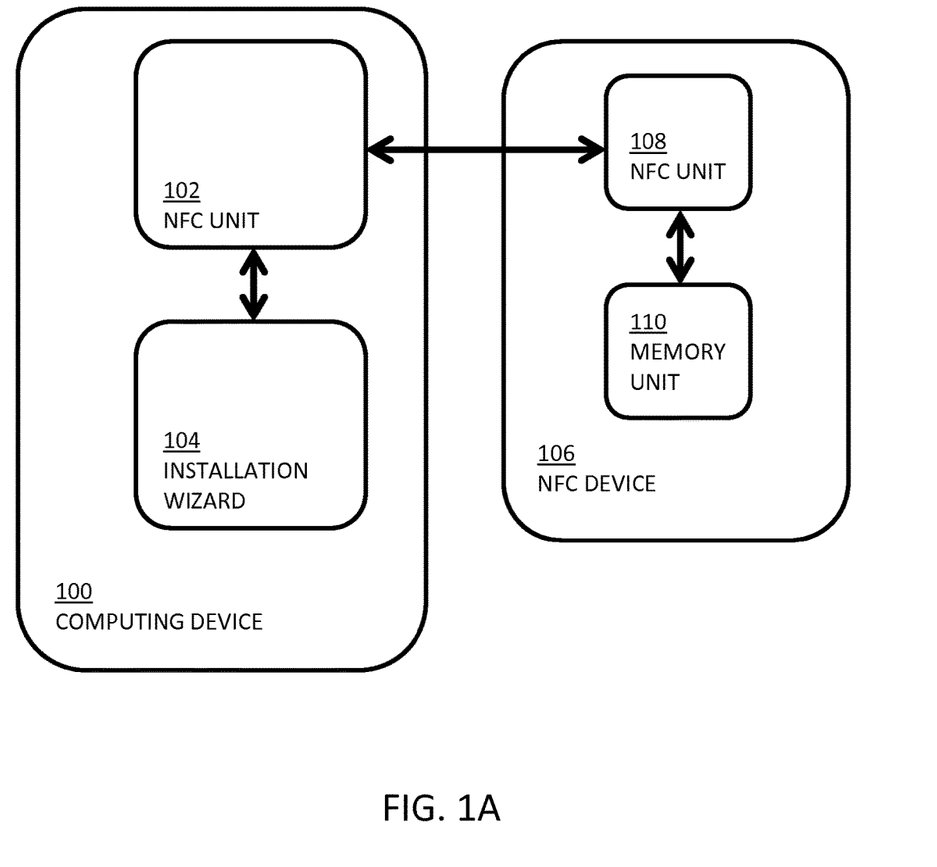
FIG. 1A shows an illustrative embodiment of a system according to the present disclosure.

FIG. 1A shows an illustrative embodiment of a system according to the present disclosure. The system comprises a computing device 100 and an NFC device 106. The computing device 100 may be a personal computer or a laptop, for example. The NFC device 106 may be an NFC-enabled smart card or an emulated NFC card embedded in a mobile device, for example. The computing device 100 comprises an NFC communication unit 102 which enables near field communication between the computing device 100 and the NFC device 106. The NFC device 106 comprises a corresponding NFC communication unit 108 and a memory unit 110. Furthermore, the computing device 100 comprises a computer program 104 which manages the installation of software on the computing device 100. This computer program 104 may also be referred to as an installation wizard. Alternatively, but without limitation, at least a part of the installation wizard 104 may reside on another device (not shown) which is connected to the computing device 100, and which may control the installation of software on the computing device 100 by executing said at least a part of the installation wizard.

The NFC device 106 may enable a more convenient and secure installation of software on the computing device 100. In particular, the NFC device 106 may be arranged to receive, through the NFC communication unit 108, a device identifier of said computing device and to store said device identifier in the memory unit 110. Furthermore, the NFC device 106 may be arranged to send, upon or after storing said device identifier, at least one software installation key through the NFC communication unit 108 to the computing device 100. Thereby, the NFC device 106 may effectively be paired with the computing device 100. Furthermore, the software installation key may be transferred conveniently to the computing device 100, in particular to the installation wizard 104. Furthermore, since a pairing step is required before the installation key is released, the installation key may not easily be copied or redistributed. Furthermore, the installation key may be relatively protected from inspection, because it is not visible to the end-user and it may only be received directly by the installation wizard 104 on request. Furthermore, the installation key may be more complex than a key that has to be entered manually into an installation wizard by an end-user. Thus, it may be more difficult to crack the installation key. Also, the installation key may, for example, be signed or encrypted before it is transmitted, which may further reduce the risk that it is cracked.

In illustrative embodiments, the NFC device 106 may further be arranged to send, to the computing device 100, at least one software installation byte which is indicative of a specific computer program or program element to be installed. In this way, since a CD or DVD may contain a plurality of programs or program elements, the installation wizard 104 may easily identify the piece of software to which a transmitted installation key corresponds. Furthermore, the NFC device 106 may be arranged to send, to the computing device, at least one software uninstallation key. In this way, the uninstallation of software may also be facilitated, as will be explained in more detail with reference to FIG. 3. Furthermore, the NFC device 106 may be arranged to prohibit overwriting and deleting the device identifier from the memory unit until the NFC device 106 receives, through the NFC communication unit 108, a delete command from the computing device 100, in particular from the installation wizard 104. Thereby, the usage of the software may be better controlled, in particular by confining it to specific computing devices.

In case that a single license is purchased, for example, the user ma use the software only on one device. In that case, since the device's identifier is stored in the NFC device and cannot be overwritten, an attempt to install the software on another device will fail because the pairing step cannot be completed: the designated memory location already contains the identifier of the first device. Only by uninstalling the software from the device in accordance with the present disclosed uninstallation method, the designated memory location may again become available, and the software may be installed on the other device. Thus, in this scenario, the NFC device may effectively be locked to a computing device.

Furthermore, in illustrative embodiments, the NFC device 106 may be arranged to accommodate, in the memory unit, at least one authentication key for authenticating the NFC device 106 to the computing device 100. In this way, the computing device 100 may verify the authenticity of the NFC device 106. For example, so-called Key 1A and Key 1B authentication keys may have been stored in the memory unit of the NFC device 106; these keys may be used in an authentication process between the installation wizard 104 and the NFC device 106. The authentication keys Key 1A and Key 1B are defined in the MIFARE® standard. Furthermore, in a first-level authentication process according to the MIFARE® standard a Random Identifier (RID) may be used, which is a function of the Unique Identifier (UID) of the NFC device 106 and a random number, in order to protect the UID. However, it is noted that other authentication processes and authentication keys may also be used in the presently disclosed methods. That is to say, the authentication process in the presently disclosed methods is not limited to MIFARE® authentication.

Furthermore, the computing device 100 may comprise a secure element (not shown) for generating the device identifier. In particular, a value generated by said secure element may be used as device identifier instead of, for example, the Media Access Control (MAC) address of the computing device 100. In this way, a higher level of security may be achieved.

Figure 1B:
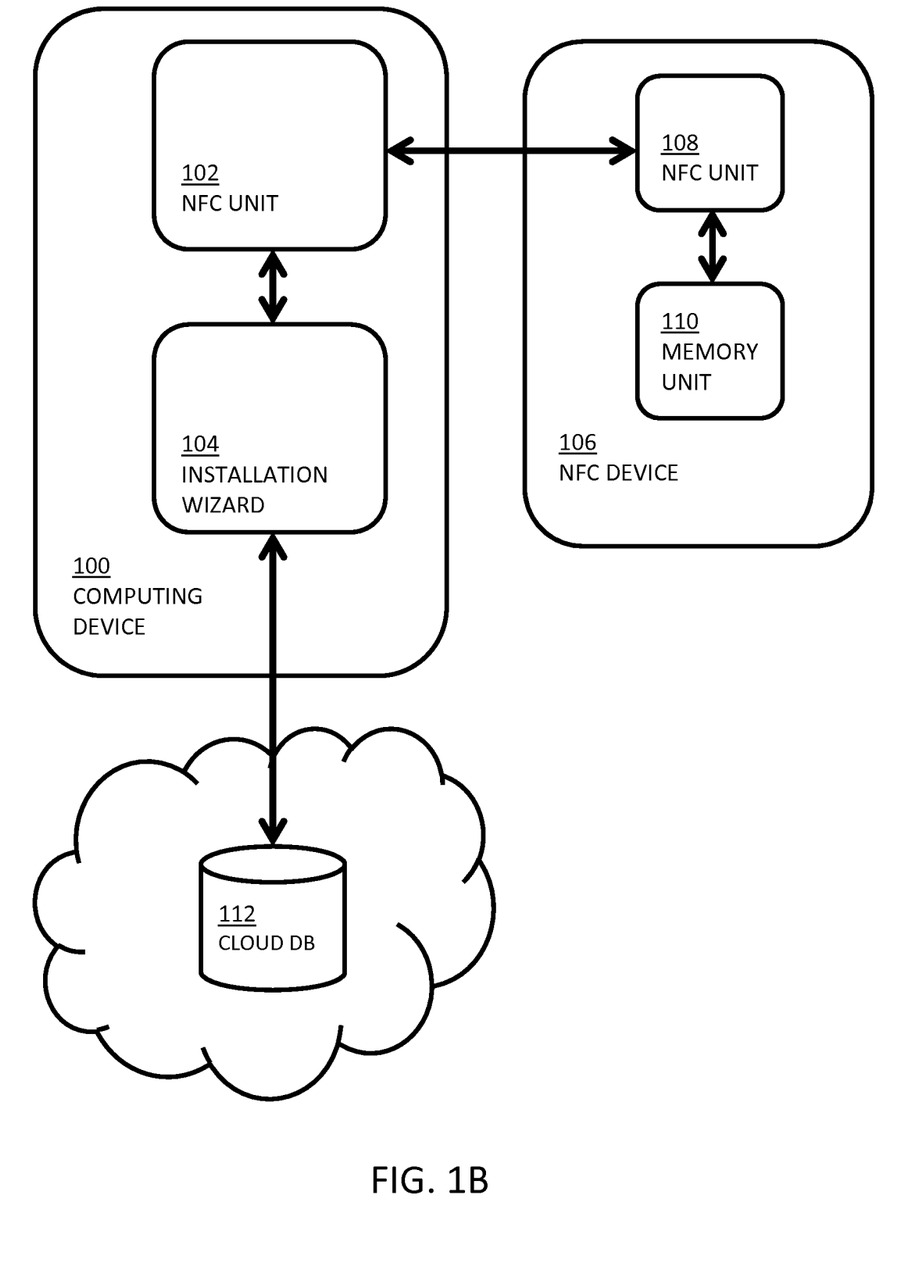
FIG. 1B shows a further illustrative embodiment of a system according to the present disclosure.

FIG. 1B shows a further illustrative embodiment of a system according to the present disclosure. This system comprises, in addition to the components already shown in FIG. 1A, a cloud database 112. The cloud database 112 may comprise a record of the pairing relationship between the NFC device 106 and the computing device 100. In this way, in case there are multiple computing devices, it is easy to keep track of the computing devices on which a particular piece of software has been validly installed. In addition, the cloud database 112 may enable verification in case that someone has tampered with the NFC device 106 and attempts to change parameters without permission. That is to say, since the cloud database 112 contains a back-up of the pairing relationship, its contents should match the contents of the NFC device 106, and a mismatch may be detected relatively easily. Furthermore, the cloud database 112 may facilitate the distribution of software updates, because it provides a clear overview of the validly installed software for each user (NFC device owner).

Figure 2:
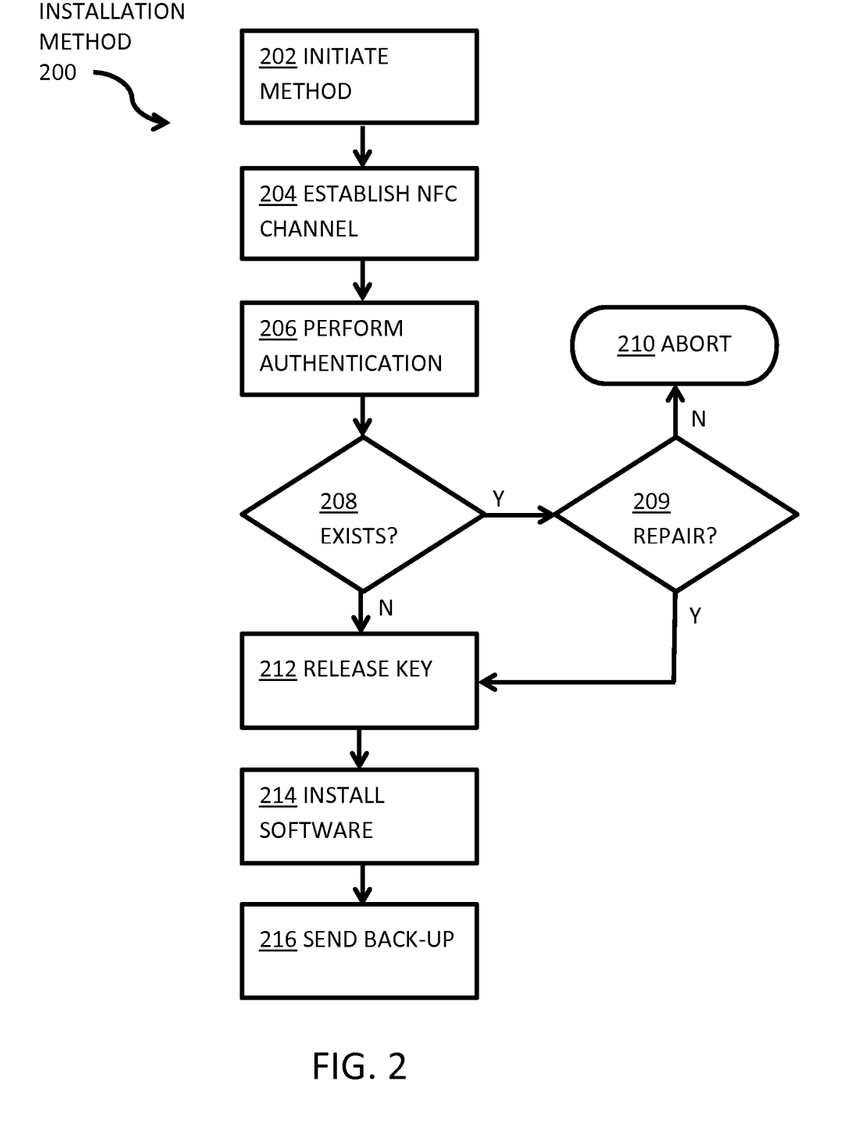
FIG. 2 shows an illustrative embodiment of an installation method according to the present disclosure.

FIG. 2 shows an illustrative embodiment of an installation method 200 according to the present disclosure. The installation method 200 may be initiated at 202. A near field communication channel may be established between the computing device 100 and the NFC device 106 at 204. Furthermore, an authentication process may be performed between the computing device 100 and the NFC device 106 at 206. In particular, as described above, the computing device 100 may verify the authenticity of the NFC device 106. Furthermore, it may be checked, at 208, if a particular combination of a device identifier and installation byte already exists in the memory unit 110 of the NFC device 106. If so, then it may be checked, at 209, whether the software to be installed is a repair version, for example a software patch. If not, then the installation may be aborted at 210, because it may be assumed that the software in question has already been installed on the computing device 100. If the particular combination of the device identifier and installation byte does not exist, or if the software to be installed is a repair version, then the device identifier and installation byte may be written, at 210, into the memory unit 100 of the NFC device 106. Next, at least one installation key may be released by the NFC device 106, at 212, to the computing device 100, in particular to the installation wizard 104. If the installation key is correct, then the software may be installed at 214, and the installation wizard 104 may acknowledge to the NFC device 106 that the installation has been performed successfully. Finally, the installation wizard 104 may send, at 216, information on the newly established pairing relationship and the installed software to the cloud database 112, where it may be stored as a backup. For example, this information may be provided in the form of a triple consisting of the unique identifier (UID) of the NFC device 106, the device identifier of the computing device 100 and the installation byte which identifies the installed software.

Figure 3:
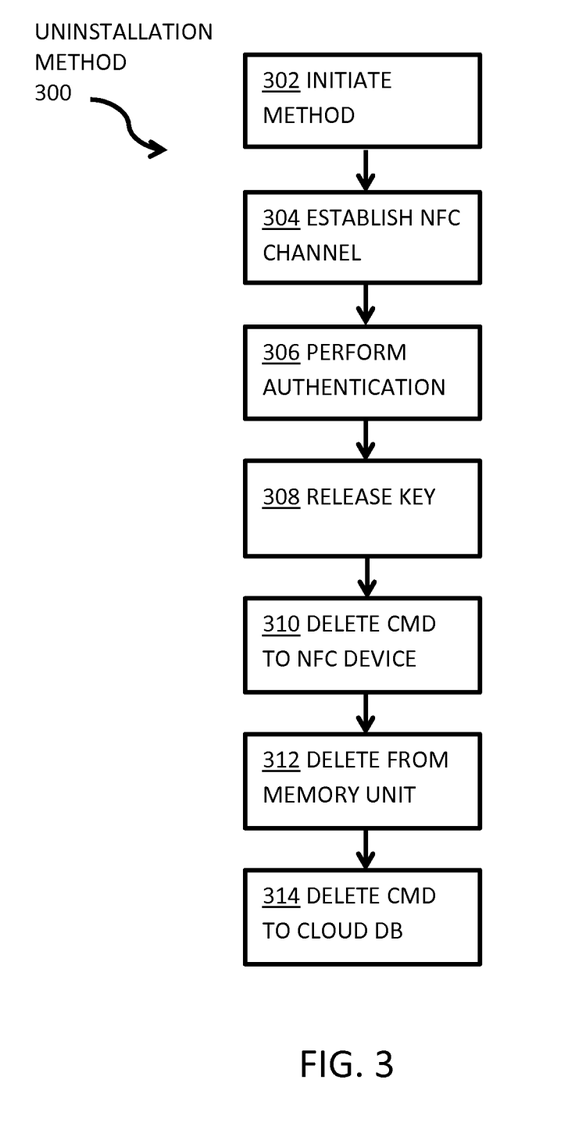
FIG. 3 shows an illustrative embodiment of an uninstallation method according to the present disclosure.

FIG. 3 shows an illustrative embodiment of an uninstallation method 300 according to the present disclosure. The uninstallation method 300 may be initiated at 302. A near field communication channel may be established between the computing device 100 and the NFC device 106 at 304. Furthermore, an authentication process may be performed between the computing device 100 and the NFC device 106 at 306. Upon or after successful authentication, at least one uninstallation key may be sent by the NFC device 106, at 308, to the computing device 100. Subsequently, the software in question may be uninstalled, at 310, using the uninstallation key. In particular, the uninstallation may be performed by the installation wizard 104. Furthermore, the installation wizard 104 may send to the NFC device 106, at 310, a command for removing the device identifier and the installation byte from the memory unit 110. In response thereto, the NFC device 106 may remove, at 312, the device identifier and the installation byte from the memory unit 110, and send a confirmation of said removal to the installation wizard 104. Finally, at 314, the installation wizard 104 may send a delete command to the cloud database 112, in order to remove the information regarding the pairing relationship and the installed software.

Figure 4:
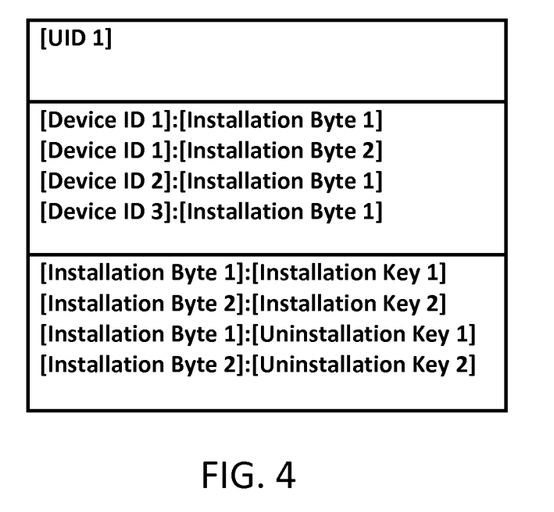
FIG. 4 shows an illustrative embodiment of a memory content of an NFC device according to the present disclosure.

FIG. 4 shows an illustrative embodiment of a memory content of an NFC device 106 according to the present disclosure. For each installed piece of software, a record may be stored in the memory unit 110, which contains the device identifier and the installation byte. In the present example, a computer program identified by "Installation Byte 1" has been installed on the computing device identified by "Device ID 1", the computing device identified by "Device ID 2" and the computing device identified by "Device ID 3". Furthermore, another computer program, identified by "Installation Byte 2", has been installed on the computing device identified by "Device ID 1". Furthermore, for each computer program, the memory unit 110 may contain one or more installation keys and one or more uninstallation keys. In the present example, the memory unit 110 specifies one installation key and one uninstallation key for the computer program identified by "Installation Byte 1", and one installation key and one uninstallation key for the computer program identified by "Installation Byte 2". Furthermore, the memory unit 110 may contain an identifier of the NFC device 106. In the present example, this identifier is the unique identifier "UID 1".

Figure 5:
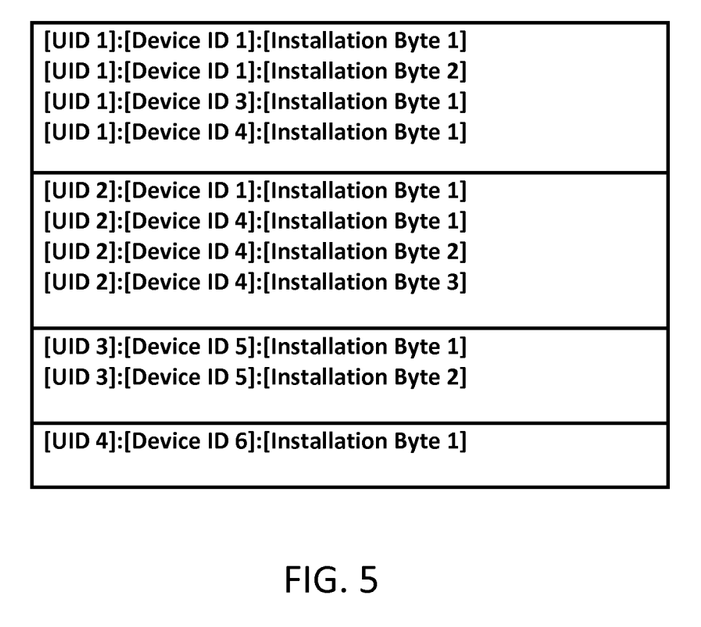
FIG. 5 shows an illustrative embodiment of a memory content of a cloud database according to the present disclosure.

FIG. 5 shows an illustrative embodiment of a memory content of a cloud database 112 according to the present disclosure. For different NFC devices, identified by "UID 1", "UID 2", "UID 3" and "UID 4", respectively, combinations of device identifiers and installation bytes may be stored. In the present example, the content of the cloud database 112 shows that the computer program identified by "Installation Byte 1" has been validly installed, for a user having an NFC device identified by "UID 1", on the computing devices identified by "Device ID 1", "Device ID 3" and "Device ID 4", for another user having an NFC device identified by "UID 2", on the computing devices identified by "Device ID 1" and "Device ID 4", for yet another user having an NFC device identified by "UID 3", on the computing device identified by "Device ID 5", and for a further user having an NFC device identified by "UID 4", on the computing device identified by "Device ID 6". In this way, the cloud database 112 may offer an easy way to keep track of validly installed software and the use of software licenses.

It is noted that the embodiments above have been described with reference to different subject-matters. In particular, some embodiments may have been described with reference to method-type claims whereas other embodiments may have been described with reference to apparatus-type claims. However, a person skilled in the art will gather from the above that, unless otherwise indicated, in addition to any combination of features belonging to one type of subject-matter also any combination of features relating to different subject-matters, in particular a combination of features of the method-type claims and features of the apparatus-type claims, is considered to be disclosed with this document.

Furthermore, it is noted that the drawings are schematic. In different drawings, similar or identical elements are provided with the same reference signs. Furthermore, it is noted that in an effort to provide a concise description of the illustrative embodiments, implementation details which fail into the customary practice of the skilled person may not have been described. It should be appreciated that in the development of any such implementation, as in any engineering or design project, numerous implementation-specific decisions trust be made in order to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill.

Finally, it is noted that the skilled person will be able to design many alternative embodiments without departing from the scope of the appended claims. In the claims, any reference sign placed between parentheses shall not be construed as limiting the claim. The word "comprise(s)" or "comprising" does not exclude the presence of elements or steps other than those listed in a claim. The word "a" or "an" preceding an element does not exclude the presence of a plurality of such elements. Measures recited in the claims may be implemented by means of hardware comprising several distinct elements and/or by means of a suitably programmed processor. In a device claim enumerating several means, several of these means may be embodied by one and the same item of hardware. The mere fact that certain measures are recited in mutually different dependent claims does not indicate that a combination of these measures cannot be used to advantage.

LIST OF REFERENCE SIGNS 100 computing device
102 NFC communication unit
104 installation wizard
106 NFC device
108 NFC communication unit
110 memory unit
112 cloud database
200 software installation method
202 initiate installation method
204 establish NFC channel
206 perform authentication process
208 check presence in memory unit
209 check if install is a repair install
210 abort installation
212 transmit installation key
214 install software
216 send backup data to cloud database
300 software uninstallation method
302 initiate uninstallation method
304 establish NFC channel
306 perform authentication process
308 transmit uninstallation key
310 send delete command to NFC device
312 delete from memory unit
314 send delete command to cloud database

The invention claimed is:

1. A Near Field Communication (NFC) device comprising an NFC communication transmitter and receiver and a memory; the NFC device being configured to
receive, through an installation wizard of the NFC communication transmitter and receiver, a device identifier of a particular computing device and to store said device identifier in the memory, wherein the installation wizard is configured to lock the NFC device with the particular computing device and send a record on a pairing relationship between the NFC device and the particular computing device to a cloud database,
send, upon or after storing said device identifier, at least one software installation key through the NFC communication transmitter and receiver to the particular computing device, and
prohibit overwriting and deleting the device identifier from the memory until the NFC device receives, through the installation wizard of the NFC communication transmitter and receiver, a delete command from the particular computing device.

2. The NFC device as claimed in claim 1, further configured to send, to the particular computing device, at least one software installation byte which is indicative of a specific computer program or program element to be installed.

3. The NFC device as claimed in claim 1, further configured to send, to the particular computing device, at least one software uninstallation key.

4. The NFC device as claimed in claim 1, further configured to accommodate, in the memory, at least one authentication key for authenticating the NFC device to the particular computing device.

5. The NFC device as claimed in claim 1, wherein the NFC device is an NFC-enabled smart card.

6. The NFC device as claimed in claim 1, wherein the NFC device is an emulated NFC card.

7. The NFC device as claimed in claim 6, wherein the emulated NFC card is embedded in an NFC-enabled mobile device.

8. The NFC device as claimed in claim 1, wherein said particular computing device comprises:
a further NFC communication transmitter and receiver configured to establish communication with the NFC device.

9. The NFC device as claimed in claim 8, wherein the cloud database is configured to store the record of the pairing relationship between the NFC device and the particular computing device.

10. The NFC device as claimed in claim 8, wherein the particular computing device comprises a secure element configured to generate the device identifier.

11. A software installation method comprising:
receiving, by an NFC device, through an installation wizard of an NFC communication transmitter and receiver comprised in the NFC device, a device identifier of a particular computing device and storing, by the NFC device, said device identifier in a memory comprised in the NFC device, wherein the installation wizard is configured to lock the NFC device with the particular computing device and send a record on a pairing relationship between the NFC device and the particular computing device to a cloud database;
sending, by the NFC device, upon or after storing said device identifier, at least one software installation key through the NFC communication transmitter and receiver to the particular computing device
prohibiting, by the NFC device, overwriting and deleting the device identifier from the memory until the NFC device receives, through the installation wizard of the NFC communication transmitter and receiver, a delete command from the particular computing device.

12. An article of manufacture including a non-transitory computer-readable storage medium having a computer program stored thereon that comprises executable instructions which, when being executed by a processor, cause said processor to perform a software installation method, the article of manufacture comprising:
instructions for receiving, by an NFC device, through an installation wizard of an NFC communication transmitter and receiver comprised in the NFC device, a device identifier of a particular computing device and storing, by the NFC device, said device identifier in a memory comprised in the NFC device, wherein the installation wizard is configured to lock the NFC device with the particular computing device and send a record on a pairing relationship between the NFC device and the particular computing device to a cloud database;
instructions for sending, by the NFC device, upon or after storing said device identifier, at least one software installation key through the NFC communication transmitter and receiver to the particular computing device; and
instructions for prohibiting, by the NFC device, overwriting and deleting the device identifier from the memory until the NFC device receives, through the installation wizard of the NFC communication transmitter and receiver, a delete command from the particular computing device.

* * * * *